(12) United States Patent
Reynolds et al.

(10) Patent No.: US 11,443,476 B2
(45) Date of Patent: Sep. 13, 2022

(54) IMAGE DATA PROCESSING METHOD AND APPARATUS

(71) Applicant: CANON MEDICAL SYSTEMS CORPORATION, Otawara (JP)

(72) Inventors: Steven Reynolds, Edinburgh (GB); Ross Davies, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 57 days.

(21) Appl. No.: 16/884,588

(22) Filed: May 27, 2020

(65) Prior Publication Data
US 2021/0375027 A1     Dec. 2, 2021

(51) Int. Cl.
| | |
|---|---|
| *G06T 15/08* | (2011.01) |
| *G06F 3/0484* | (2022.01) |
| *G06T 7/11* | (2017.01) |

(52) U.S. Cl.
CPC ............ *G06T 15/08* (2013.01); *G06F 3/0484* (2013.01); *G06T 7/11* (2017.01); *G06T 2207/10116* (2013.01); *G06T 2207/30004* (2013.01); *G06T 2210/41* (2013.01)

(58) Field of Classification Search
CPC ......... G06F 3/0484; G06T 7/11; G06T 15/08; G06T 2207/10116; G06T 2207/30004; G06T 2210/41
See application file for complete search history.

(56) References Cited

U.S. PATENT DOCUMENTS

| | | | | |
|---|---|---|---|---|
| 2004/0017370 A1* | 1/2004 | Miyamoto | .............. | G06T 15/08 345/426 |
| 2006/0241430 A1* | 10/2006 | Lin | ...................... | G10K 11/346 600/437 |
| 2006/0250395 A1* | 11/2006 | Kwon | ..................... | G06T 15/08 345/424 |
| 2010/0134491 A1* | 6/2010 | Borland | .................. | G06T 15/06 382/131 |
| 2012/0212488 A1* | 8/2012 | Yu | ........................... | G06T 15/00 345/422 |
| 2013/0113802 A1* | 5/2013 | Weersink | ............. | A61N 5/1071 345/427 |
| 2014/0112564 A1* | 4/2014 | Hsiao | ............... | G01R 33/56316 382/131 |

(Continued)

OTHER PUBLICATIONS

Gao et al. "Visibility culling using plenoptic opacity functions for large volume visualization." IEEE Visualization, 2003. VIS 2003.. IEEE, 2003. (Year: 2003).*

(Continued)

*Primary Examiner* — Katrina R Fujita
(74) *Attorney, Agent, or Firm* — Oblon, McClelland, Maier & Neustadt, L.L.P.

(57) ABSTRACT

A medical processing apparatus comprises processing circuitry configured to: receive an image data set for rendering; for each of a plurality of a pixels or voxels in the image data set: set a region of interest around the pixel or voxel; determine a maximum data value and a minimum data value for pixels or voxels in the region of interest; and designate the pixel or voxel as visible or as non-visible based on the maximum data value and the minimum data value for the region of interest; and perform a rendering process using the pixels or voxels of the image data set that designated as visible.

20 Claims, 5 Drawing Sheets

(56) References Cited

U.S. PATENT DOCUMENTS

| | | | |
|---|---|---|---|
| 2014/0375631 A1* | 12/2014 | Masumoto | A61B 8/0891 |
| | | | 345/419 |
| 2017/0161909 A1* | 6/2017 | Hamanaka | A63F 13/57 |
| 2018/0053334 A1* | 2/2018 | Schneider | G06T 15/08 |
| 2018/0225862 A1* | 8/2018 | Petkov | G06T 15/06 |
| 2019/0378324 A1* | 12/2019 | Wahrenberg | G06T 7/11 |

OTHER PUBLICATIONS

Liu, et al. "A volume rendering method based on multiple segmentation results." 2010 3rd International Congress on Image and Signal Processing. vol. 1. IEEE, 2010. (Year: 2010).*

Macready et al. "Interactive dual-volume rendering visualization with real-time fusion and transfer function enhancement." Medical Imaging 2006: Visualization, Image-Guided Procedures, and Display. vol. 6141. International Society for Optics and Photonics, 2006. (Year: 2006).*

Pinto et al. "Two-level interaction transfer function design combining boundary emphasis, manual specification and evolutive generation." 2006 19th Brazilian Symposium on Computer Graphics and Image Processing. IEEE, 2006. (Year: 2006).*

Wang et al. "Efficient opacity specification based on feature visibilities in direct volume rendering." Computer Graphics Forum. vol. 30. No. 7. Oxford, UK: Blackwell Publishing Ltd, 2011. (Year: 2011).*

Zhang et al. "A visualization system for interactive exploration of the cardiac anatomy." Journal of medical systems 40.6 (2016): 135. (Year: 2016).*

\* cited by examiner

IMAGE DATA PROCESSING METHOD AND APPARATUS

FIELD

Embodiments described herein relate generally to an apparatus and method for image data processing, for example determining visibility of each of a set of pixels or voxels and rendering pixels or voxels that are determined to be visible.

BACKGROUND

Volumetric medical imaging techniques that can produce three-dimensional medical imaging data using any of a variety of imaging modalities, for example CT, PET, MRI, ultrasound, and X-ray, are now widely used for imaging or diagnostic purposes.

Volumetric medical image data may comprise a three-dimensional array of voxels, each voxel representative of a particular position in three-dimensional space and each voxel having one or more data values. For example in the case of CT data, each voxel may have an associated intensity value that is representative of the attenuation of the applied X-ray radiation provided at the location represented by the voxel. The intensity value may be referred to as an image value, gray value, gray level, voxel value or CT value. The intensity value may be measured in Hounsfield units (HU).

A wide variety of rendering techniques are known that are used to process volumetric image data in order to display a desired representation of a patient or other subject. For example, the volumetric image data may be rendered to display a two-dimensional projection of the three dimensional volumetric data. The two-dimensional projection may include desired texture or shading effects, and may provide an impression of a surface in three dimensions to the viewer.

Commonly used volume rendering techniques use a transfer function to map each of a series of sampled voxel values to an opacity value and a color value (usually represented by a combination of red, green and blue color values). In ray casting and similar techniques, for each pixel in the 2D projection a virtual ray is cast from the perspective of the viewer through a corresponding point on a two-dimensional virtual image plane and through the volume represented by the volumetric image data. Color and opacity values are accumulated along the virtual ray to obtain a color for the pixel in the 2D projection.

In some circumstances, it may be desirable to visualize an isosurface boundary between two materials. FIG. 1 illustrates an example of a transfer function that may be used to visualize an isosurface boundary. The transfer function of FIG. 1 may be referred to as a spike transfer function.

FIG. 1 comprises a plot 10. The horizontal axis 12 of plot 10 is data value, for example an intensity value. The vertical axis 14 of plot 10 is opacity.

Region 16 is a representation of a histogram of a data set, where a vertical dimension of the region 16 is a number of voxels having a data value as indicated on the horizontal axis 12. The histogram may be considered to be a bar chart having one bar per possible data value in the data set. A height of each bar is representative of a total number of voxels having that data value.

Curve 18 is representative of a transfer function which plots opacity against data value. The transfer function may be determined based on the histogram of region 16. It is noted that the transfer function of plot 10 is purely exemplary and the data values of plot 10 are not representative of data values obtained in a real imaging process.

According to the transfer function, opacity is zero for voxels having a data value of less than 35. Opacity is zero for voxels having a data value of greater than 70. Therefore, voxels having a data value of less than 35 or greater than 70 are not visible when the transfer function 18 is applied. Voxels having data values between 35 and 70 have non-zero opacity. The curve 18 peaks at a data value of 52.5. The data value of 52.5 may be considered to represent a boundary between voxels that are representative of a first material and have data values below 52.5, and voxels that are representative of a second material and have data values above 52.5. The transfer function 18 may be applied to a volumetric medical imaging data set in order to visualize that boundary in rendering.

Rendering of volumetric medical imaging may be resource-intensive. One known method for reducing the resources required for volumetric rendering is to disregard voxels that are not expected to provide any contribution to a final rendered image, or voxels that are expected to provide only a very low contribution to the final rendered image.

Thresholding is a classification method that is used to designate voxels of a volumetric data set as visible or non-visible. Voxels that are designated as visible may be voxels that are expected to provide a contribution to an image rendered from the volumetric data set. Voxels that are designated as non-visible may be voxels that are not expected to provide a contribution to an image rendered from the volumetric data set.

It is noted that, in practice, not all voxels that are designated as visible will contribute to every image rendered from the volumetric data set. For example, in a given rendering process, some voxels that are designated as visible may be obscured by other voxels that are designated as visible. The designation of whether a voxel is visible may be based on properties of that voxel in isolation and not on properties of the volumetric data set or a whole, or of a specific rendering of the volumetric data set.

Voxels that are designated as non-visible may be disregarded in rendering. Knowing where the visible voxels are may accelerate rendering.

A naïve thresholding method checks a data value associated with each voxel individually to determine whether the voxel is designated as visible or as non-visible. With some transfer functions, it has been found that naïve thresholding can result in needed voxels being missed from the classification. The missing voxels may cause artefacts during rendering.

FIG. 2 shows an example of a region 20 of voxels. Each voxel is represented by a respective box. A number in the box is representative of a data value of the voxel. The data values in FIG. 2 are exemplary and are not representative of data values obtained in a real imaging process.

The region 20 shown in FIG. 2 may be considered to be representative of a region in which a first material has a boundary with a second material. In FIG. 2, voxels 22 have data values between 0 and 8 and may be considered to correspond to a first material. Voxels 24 have data values between 86 and 99 and may be considered to correspond to a second material. In the example of FIG. 2, no voxels in region 20 have data values that are intermediate between the low data values of the first material and the high data values of the second material. In particular, no voxels in region 20 have data values between 35 and 70.

The transfer function 18 of FIG. 1 may be applied to the voxels of FIG. 2. The transfer function may also be referred to as an opacity curve. The transfer function 18 associates each data value with a respective opacity value. Each voxel is thereby assigned an opacity value.

A naïve thresholding method may be applied, in which voxels having zero opacity are designated as non-visible, and voxels having non-zero opacity are designated as visible. In the case of region 20, each voxel has an opacity value of zero according to transfer function 18. It may be seen that such a naïve thresholding method would designate all the voxels of region 20 as non-visible and the voxels of region 20 would therefore be omitted from rendering.

A naïve thresholding method may therefore result in the boundary between the first material in FIG. 2 and the second material in FIG. 2 being omitted from rendering. Using the opacity curve 18 of FIG. 1 to determine the visibility for region 20 of FIG. 2 using a naïve thresholding method results in missed voxels as each voxel value maps to a completely transparent value in the opacity curve 18.

It has been found that rendering using a naïve thresholding method, in which voxels designated as non-visible are omitted from the rendering process, may result in artefacts. In some circumstances, the artefacts may be described as blocky artefacts. The artefacts may have the appearance of square or rectangular sections that have different grey levels from surrounding parts of the image.

BRIEF DESCRIPTION OF THE DRAWINGS

Embodiments are now described, by way of non-limiting example, and are illustrated in the following figures, in which.

DETAILED DESCRIPTION

Certain embodiments provide a medical processing apparatus comprising processing circuitry configured to: receive an image data set for rendering; for each of a plurality of a pixels or voxels in the image data set: set a region of interest around the pixel or voxel; determine a maximum data value and a minimum data value for pixels or voxels in the region of interest; and designate the pixel or voxel as visible or as non-visible based on the maximum data value and the minimum data value for the region of interest; and perform a rendering process using the pixels or voxels of the image data set that are designated as visible.

Certain embodiments provide a medical processing method comprising: receiving an image data set for rendering; for each of a plurality of a pixels or voxels in the image data set: setting a region of interest around the pixel or voxel; determining a maximum data value and a minimum data value for pixels or voxels in the region of interest; and designating the pixel or voxel as visible or as non-visible based on the maximum data value and the minimum data value for the region of interest; and performing a rendering process using the pixels or voxels of the image data set that are designated as visible.

Figure 3:
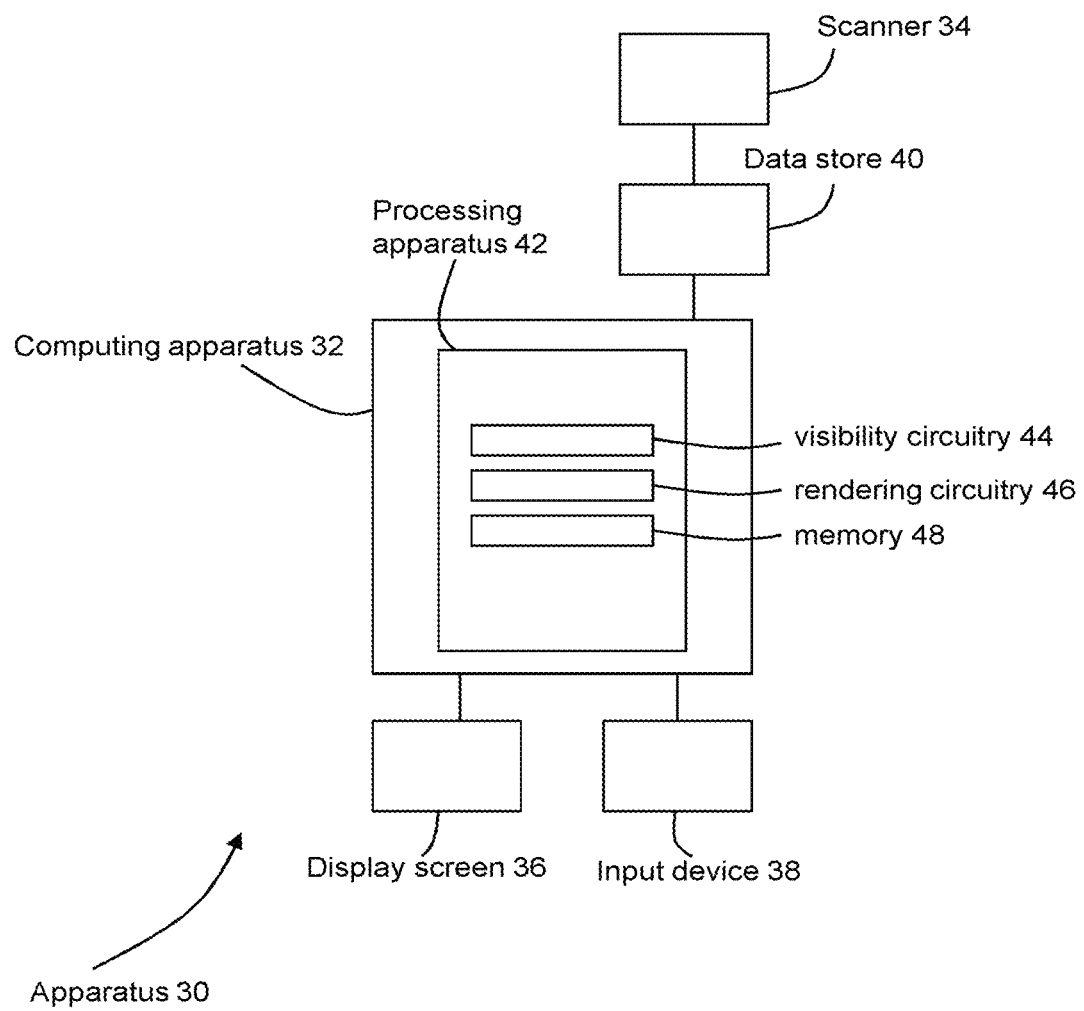
FIG. 3 is a schematic diagram of an apparatus according to an embodiment.

A medical image processing apparatus 30 according to an embodiment is illustrated schematically in FIG. 3. The medical image processing apparatus 30 comprises a computing apparatus 32, in this case a personal computer (PC) or workstation, which is connected to a scanner 34 via a data store 40.

The medical image processing apparatus 30 further comprises one or more display screens 36 and an input device or devices 38, such as a computer keyboard, mouse or trackball.

In the present embodiment, the scanner 34 is a CT (computed tomography) scanner which is configured to obtain volumetric CT scans. The scanner 34 is configured to generate image data that is representative of at least one anatomical region of a patient or other subject. The image data comprises a plurality of voxels each having a corresponding data value, which in the case of CT scanning is an intensity value, for example a value in Hounsfield units.

In other embodiments, the scanner 34 may be configured to obtain two-, three- or four-dimensional image data in any imaging modality. For example, the scanner 34 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 34 are stored in data store 40 and subsequently provided to computing apparatus 32. In an alternative embodiment, image data sets are supplied from a remote data store (not shown). The data store 40 or remote data store may comprise any suitable form of memory storage. In some embodiments, the medical image processing apparatus 30 is not coupled to any scanner.

Computing apparatus 32 comprises a processing apparatus 42 for processing of data. The processing apparatus comprises a central processing unit (CPU) and Graphical Processing Unit (GPU). The processing apparatus 42 provides a processing resource for automatically or semi-automatically processing medical image data sets. In other embodiments, the data to be processed may comprise any image data, which may not be medical image data.

The processing apparatus 42 includes visibility circuitry 44 configured to determine whether voxels are to be designated as visible, rendering circuitry 46 configured to perform a rendering process using the visible voxels, and a memory 48. In some embodiments, a visibility determining process may be used to identify voxels to be used for a process that is not a rendering process. In some such embodiments, the rendering circuitry 46 may be omitted.

In the present embodiment, the circuitries 44, 46 and the memory 48 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 32 also includes a hard drive and other components of a PC including RAM, ROM, a data bus, an operating system including various device drivers, and hardware devices including a graphics card. Such components are not shown in FIG. 3 for clarity.

Figures 4, 5:
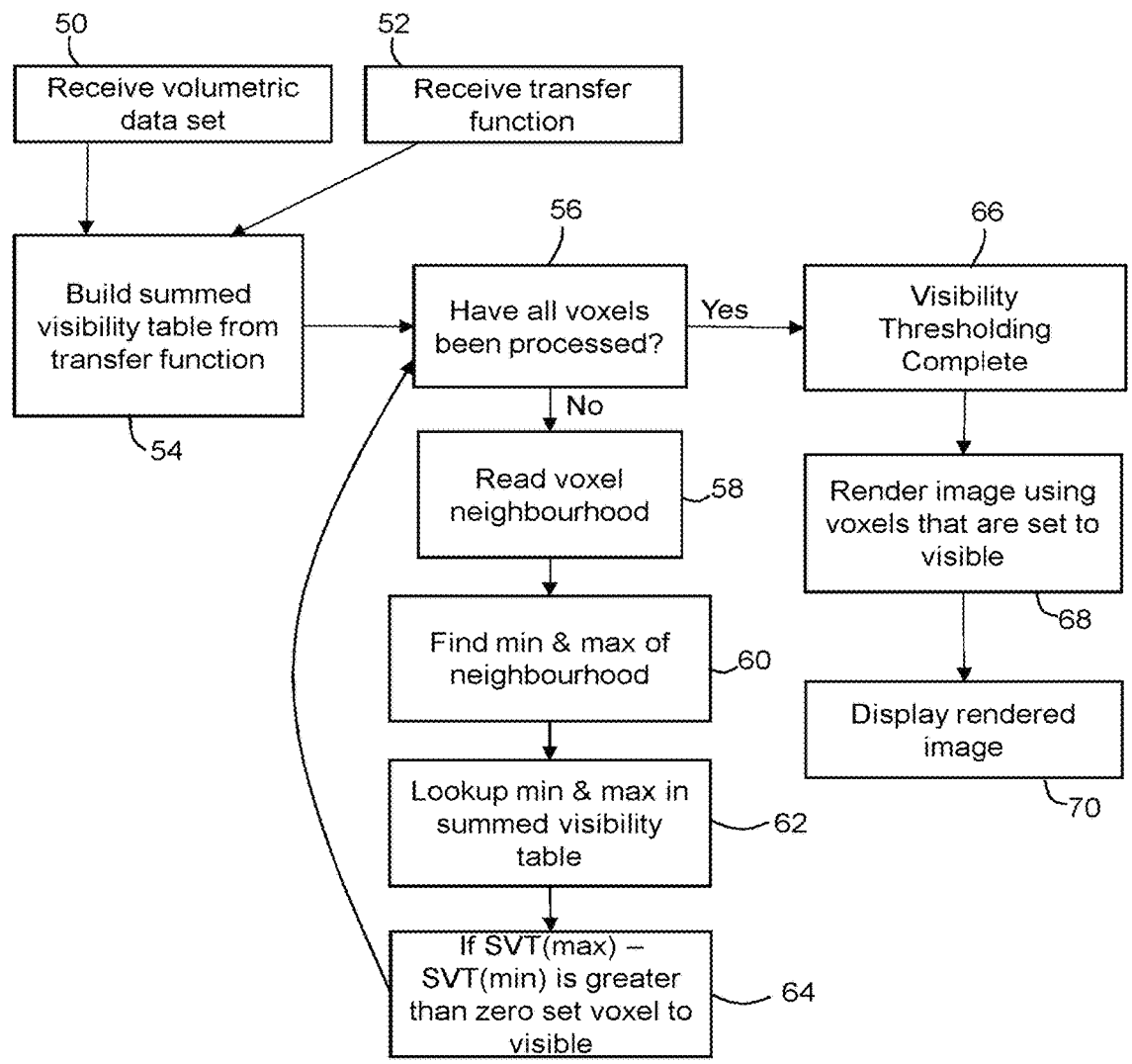
FIG. 4 is a flow chart illustrating in overview a method in accordance with an embodiment.
FIG. 5 is an example of a visibility table.

The apparatus of FIG. 3 is configured to perform a method of processing medical image data as illustrated in FIG. 4.

At stage 50, the visibility circuitry 44 receives a volumetric image data set obtained from a CT scan performed by scanner 34. The volumetric image data set comprises respective intensity values for a plurality of voxels of the volumetric image data set. In further embodiments, the volumetric image data set may comprise any suitable medical image data, for example perfusion data. In further embodiments, the volumetric image data set may comprise any appropriate image data, which may not be medical.

At stage 52, the visibility circuitry 44 receives a transfer function relating data values to opacity values. The transfer function may also relate data values to color values. In the following example, the transfer function is different from the transfer function illustrated in FIG. 1.

At stage 54, the visibility circuitry 44 uses the transfer function to build a summed visibility table, which is then stored in the memory 48. The summed visibility table is used to consider any possible linear interpolation when determining whether a voxel is to be designated as visible.

An example 80 of a summed visibility table is illustrated in FIG. 5.

To build the summed visibility table, the visibility circuitry 44 first determines a range of data values that are present in the volumetric image data set. The visibility circuitry 44 determines a minimum data value and a maximum data value for the voxels present in the volumetric image data set. The minimum data value in the volumetric image data set may be denoted as data min. The minimum data value in the volumetric image data set may be referred to as a global minimum. The maximum data value in the volumetric image data set may be denoted as data max. The maximum data value in the volumetric image data set may be referred to as a global maximum. In the example 80, data min is 0 and data max is 9.

A first row 82 of the summed visibility table comprises data values from data min to data max. In the example 80, the data values are integer values. In other embodiments, any suitable increment between consecutive data values may be used.

A second row 84 of the summed visibility table comprises a respective opacity value for each of the data values from data min to data max in row 82. The visibility circuitry 44 determines the opacity values of row 84 by applying the transfer function obtained at stage 52. The opacity value for a given data value is obtained by applying the transfer function to the data value.

A third row 86 of the summed visibility table comprises a respective visibility value for each of the data values from data min to data max. The visibility values of row 86 are obtained using the opacity values of row 84. If the opacity value for a given data value is greater than 0, the visibility for that data value is set to 1. If the opacity value for a given data value is 0, the visibility for that data value is set to 0. The visibility values may be described as first index values.

In other embodiments, a non-zero opacity threshold may be used. For example, an opacity threshold of 0.005, 0.01 or 0.02 may be used. In such embodiments, the visibility for a data value may be set to 1 if the opacity is greater than the opacity threshold, and set to 0 if the opacity is not greater than the opacity threshold. In some embodiments, voxels with opacity below an opacity threshold may be classified as a different object from voxels with an opacity above the opacity threshold. For example, voxels having an opacity from 0 to 0.02 may be treated as a different object from voxels with higher opacity. The different object may be handled differently in rendering.

In further embodiments, a set of visibility values may be determined directly from the transfer function without first determining a set of opacity values. In some embodiments, opacity values are not stored in the summed visibility table.

A fourth row 88 of the summed visibility table comprises a respective summed visibility value for each of the data values from data min to data max. The summed visibility value for each of the data values is found using the following equation:

$$v_{(i)} = \sum_{datamin}^{i} \omega_i$$

where $\omega_i$ is the visibility of a value i as obtained from the transfer function and as stored in row 86.

Summed visibility for a given data value sums values for visibility for all data values from data min to the given data value. Consider, for example, i=5 in the example of FIG. 5. The summed visibility $v_{(5)}$ is the sum of visibility values $\omega_i$ from i=data min=0 to i=5. The summed visibility $v_{(5)}$ is therefore a sum of 0+0+0+0+1+1=2.

The summed visibility values may be described as second index values.

The visibility circuitry 44 stores the visibility table in memory 48. In other embodiments, the visibility table may be stored in any suitable location. In further embodiments, any suitable method may be used to store summed visibilities. For example, summed visibilities may be stored in a list, in a look-up table, or as a function.

The visibility circuitry 44 proceeds to apply a visibility thresholding process to the volumetric image data set obtained at stage 50. The visibility thresholding process comprises stages 56 to 64 of FIG. 4. The visibility thresholding process is used to designate each voxel in the volumetric image data set as visible or non-visible. The visibility circuitry 44 generates a data structure to store visibility data. The visibility circuitry 44 stores a respective visibility for each voxel in the data structure.

The visibility thresholding process of FIG. 4 differs from a naïve thresholding process as described above, in that it takes into account data values that may be obtained through interpolation.

In rendering, a volumetric image data set is typically sampled at sample points which may have positions that do not correspond with voxel positions. A data value for a sample point is obtained by interpolating data values of voxels in a neighborhood of the sample point. An opacity for the sample point is then obtained by applying a transfer function at the sample point. Therefore, a sample point may have a data value and/or an opacity that differs from the data value and/or opacity of any of the voxels neighboring the sample point. In the visibility thresholding process of stages 56 to 64 of FIG. 4, the visibility table that was built at stage 54 is used to designate voxels as visible in a manner than takes into account data values that may be obtained by interpolation.

At stage 56, the visibility circuitry 44 determines whether all voxels have been processed. At a first instance of stage 56, no voxels have yet been processed by the visibility thresholding process and the visibility circuitry 44 proceeds to stage 58.

At stage 58, the visibility circuitry 44 selects from the volumetric image data set one of the voxels that has not yet been processed by the visibility thresholding process. The visibility circuitry 44 sets a region of interest s around the selected voxel. The region of interest s may also be referred to as a voxel neighborhood.

In the present embodiment, the region of interest s comprises the voxel of interest, and the nearest-neighbor voxels to the voxel of interest. The region of interest s is a cube comprising 27 voxels. In other embodiments, the region of interest s may comprise next-to-nearest neighbor voxels, next-to-next-to-nearest voxels, or any appropriate set of voxels around the voxel of interest.

The region of interest comprises voxels that may be potentially be combined with the selected voxel during interpolation.

The visibility circuitry 44 reads the data values for the voxels in the region of interest.

At stage 60, the visibility circuitry 44 finds a maximum data value of the data values for the voxels in the region of interest. The maximum data value in the region of interest may be denoted as max s. The visibility circuitry 44 finds a minimum data value of the data values for the voxels in the region of interest. The minimum data value in the region of interest may be denoted as min s. The minimum data value min s and maximum data value max s may be considered to define a range of possible interpolated data values. It may be considered that data values obtained by an interpolation performed within the region of interest will fall within the range min s to max s.

Any suitable method may be used to find the maximum and minimum values. In some embodiments, some processing, for example filtering, of the data values for voxels in the region of interest may be provided before the maximum and minimum values are found. A maximum or minimum value may be, for example, an average of a group of data values, an extrapolation of a group of data values, a data value that has been rounded or otherwise simplified, or a data value that has been subject to any appropriate processing. In some embodiments, a maximum data value may be obtained by increasing the largest data value in the region of interest by a predetermined amount. A minimum data value may be obtained by decreasing the smallest data value in the region of interest by a predetermined amount.

At stage 62, the visibility circuitry 44 looks up the minimum data value min s for the region of interest in the summed visibility table. The visibility circuitry 44 retrieves the value for summed visibility that is associated with the minimum data value min s in the summed visibility table. The summed visibility for the minimum data value min s may be denoted as v_min or SVT(min).

The visibility circuitry 44 looks up the maximum data value max s for the region of interest in the summed visibility table. The visibility circuitry 44 retrieves the value for summed visibility that is associated with the maximum data value max s in the summed visibility table. The summed visibility for the maximum data value max s may be denoted as v_max or SVT(max).

At stage 64, the visibility circuitry 44 obtains a difference between the summed visibility for the minimum data value v_min and the summed visibility for the maximum data value v_max.

The difference between v_min and v_max provides the sum of the visibility of all of the data values in a range from min s to max s.

$$v_{max} - v_{min} \equiv \sum_{datamin}^{max\ s} \omega_i - \sum_{datamin}^{min\ s} \omega_i \equiv \sum_{min\ s}^{max\ s} \omega_i$$

If the difference $v_{max}-v_{min}$ is zero, this indicates that there are no data values having a visibility of 1 in a range from min s to max s. Therefore, if the difference $v_{max}-v_{min}$ is zero, the visibility circuitry 44 designates the selected voxel as non-visible. For example, the visibility circuitry 44 may assign a visibility value of 0 to the selected voxel in the data structure.

If the difference $v_{max}-v_{min}$ is greater than zero, this indicates that there is at least one data values having a visibility of 1 in a range from min s to max s. Therefore, if the difference $v_{max}-v_{min}$ is greater than zero, the visibility circuitry 44 designates the selected voxel as visible. For example, the visibility circuitry 44 may assign a visibility value of 1 to the selected voxel. The visibility circuitry 44 sets the voxel to be visible in the data structure representing voxel visibility. For example, the visibility circuitry 44 may store a visibility value of 1 for the voxel in the data structure.

In other embodiments, the visibility circuitry 44 may use any appropriate method to designate voxels as visible or non-visible. For example, the visibility circuitry 44 may add a flag to the voxels that are designated as visible, and may not add the flag to the voxels that are designated as non-visible.

In the method of FIG. 4, it is assumed that interpolation of data values in the region of interest can result in any data value between min s and max s. This is true of linear interpolation, as in the present embodiment. It is also true of some cases of cubic interpolation.

Some examples of designating voxels as visible or non-visible based on a difference between summed visibility values are now described.

In a first example, the maximum data value for a region of interest around a voxel is 2 and the minimum data value for the region of interest around the voxel is 0. Using summed visibility table 80, it is found that the summed visibility for a data value of 2 is 0, and the summed visibility of a data value of 0 is 0. Therefore the difference between the summed visibilities is zero. The visibility circuitry 44 designates the voxel as non-visible. The visibility circuitry 44 adds a visibility value of 0 for the voxel in the data structure.

Other embodiments may obtain a respective visibility for every data value from 0 to 2. In such embodiments, visibility is determined using the first index value (visibility) instead of the second index value (summed visibility). The visibility for a data value of 0 is 0. The visibility for a data value of 1 is 0. The visibility for a data value of 2 is 0. Therefore, no data value within a range obtainable by interpolation of data values in a range of data values between 0 and 2 has a non-zero visibility. The voxel is designated as non-visible.

In a second example, the maximum data value for a region of interest around a voxel is 7 and the minimum data value for the region of interest around the voxel is 3. Using summed visibility table 80, it is found that the summed visibility for a data value of 7 is 3, and the summed visibility of a data value of 3 is 0. Therefore the difference between the summed visibilities is 3. Since the difference between summed visibilities is non-zero, the visibility circuitry 44 designates the voxel as visible. The visibility circuitry 44 adds a visibility value of 1 for the voxel in the data structure.

A method using respective visibilities for every data value from 3 to 7 would obtain the same answer. The visibility for a data value of 3 is 0. The visibility for a data value of 4 is 1. The visibility for a data value of 5 is 1. The visibility for a data value of 6 is 1. The visibility for a data value of 7 is 0. Three data values within a range obtainable by interpolation of data values in a range of data values between 3 and 7 have non-zero visibility. The voxel is designated as visible.

In a third example, the maximum data value for a region of interest around a voxel is 9 and the minimum data value for the region of interest around the voxel is 7. Using summed visibility table 80, it is found that the summed visibility for a data value of 9 is 3, and the summed visibility of a data value of 7 is 3. Therefore the difference between the summed visibilities is 0. Since the difference between summed visibilities is zero, the visibility circuitry 44 designates the voxel as non-visible. The visibility circuitry 44 adds a visibility value of 0 for the voxel in the data structure.

A method using respective visibilities for every data value from 7 to 9 would obtain the same answer. The visibility for a data value of 7 is 0. The visibility for a data value of 8 is 0. The visibility for a data value of 9 is 0. No data values within a range obtainable by interpolation of data values in a range of data values between 7 and 9 have non-zero visibility. The voxel is designated as non-visible.

Turning again to the flow chart of FIG. 4, after stage 64 the method of FIG. 4 returns to stage 56. Stages 56 to 64 are repeated until each voxel in the volumetric image data set has been designated either as visible or as non-visible. Corresponding visibility values for all voxels have been added to the data structure.

A voxel that are designated as visible is potentially visible when used in a rendering process, because the data value for the voxel and those for its neighboring voxels are such that a data value mapping to a visible part of the transfer function may be obtained by interpolation. One may alternatively refer to voxels being designated as potentially visible or as non-visible. A voxel that is designated as visible may not necessarily contribute to a given rendering. The voxel's contribution may depend on a direction of rendering and/or on a type of rendering used.

Once all the voxels in the volumetric image data set have been processed, the method of FIG. 4 proceeds to stage 66. At stage 66, visibility thresholding is complete. In the present embodiment, the result of the visibility thresholding algorithm is a data structure where all of the voxels to be used for rendering are designated as visible. In other embodiments, a data structure is generated that comprises only the voxels that have been designated as visible.

The visibility circuitry 44 passes the data structure to the rendering circuitry 46. In some embodiments, the data structure is stored in memory 48, or in another memory.

At stage 68, the rendering circuitry 46 renders an image from the volumetric image data set using the voxels that have been designated as visible in the data structure. Any suitable method of rendering may be used. For example, the rendering method may comprise ray casting, ray tracing or shear-warp.

The rendering method may comprise pre-integration to improve the image quality of volume rendered images. For a description of pre-integration, see, for example, Martin Kraus and Thomas Ertl. Pre-Integrated Volume Rendering. In C. D. Hansen and C. R. Johnson, Editors, *The Visualization Handbook*, Academic Press, pp. 211-228, 2004. Pre-integration may allow transfer functions with high frequency curves to be rendered without aliasing.

The rendering circuitry 46 works by interpolating the data values for a sample then looking that value up in the transfer function. This is known as post classification. Since the visibility thresholding process of FIG. 4 takes account of rendering, it may provide a better selection of visible voxels than naïve thresholding, which fails to take account of interpolation.

At stage 70, the rendering circuitry 46 displays the rendered image on display screen 36, or on any suitable display screen. In some circumstances, an image rendered using the method of FIG. 4 may have far fewer artefacts than an image rendered using a naïve thresholding method.

The method described above in relation to FIG. 4 may be used to provide a visibility determining system that thresholds on potential visibility. The visibility table may provide a one-dimensional acceleration structure to efficiently determine accurate visibility within each region of the volume. An improved classification of visible voxels may be provided.

The method of FIG. 4 may provide improved visibility thresholding. The improvement in visibility thresholding may allow improved rendering of isosurfaces, for example isosurfaces that are determined by pre-integrated rendering. In some circumstances, higher quality transfer functions may be used. In some cases, a sharpness of a ramp in an opacity curve may be narrower than a rate of change of data values.

By storing summed visibility values and subtracting a minimum summed visibility value from a maximum summed visibility value, a number of operations used to determine whether a given voxel is to be designated as visible may be kept to a minimum. Visibility for a range of data values between a minimum and maximum may be interrogated by using only two summed visibility values, rather than by using individual visibility values for each data value in the range of data values.

Using the method of FIG. 4 may provide an improvement in rendering, which may include a decrease in artefacts. Some current thresholders check each voxel value against a static threshold, for example by performing a naïve thresholding method as described above. Other current thresholders may look up each voxel value in a visibility function to determine if that voxel is visible. However, by considering voxels in isolation, such current thresholders may fail to take account of data values that may result from interpolation.

One possibility is to avoid thresholding the data set based on visibility and to treat all voxels as visible. Treating all voxels as visible will improve the image, but the performance is expected to be poor, since rendering is performed on all voxels including those that do not contribute to the final image.

One may attempt to account for interpolation by applying a morphological dilation to a thresholded data structure obtained by naïve thresholding. The morphological dilation may comprise identifying at least one section of the data set comprising visible voxels, and increasing that section in size such that neighboring voxels are also treated as visible. However, morphological dilation may not capture all voxels that are incorrectly identified as non-visible by naïve thresholding.

Figure 2:
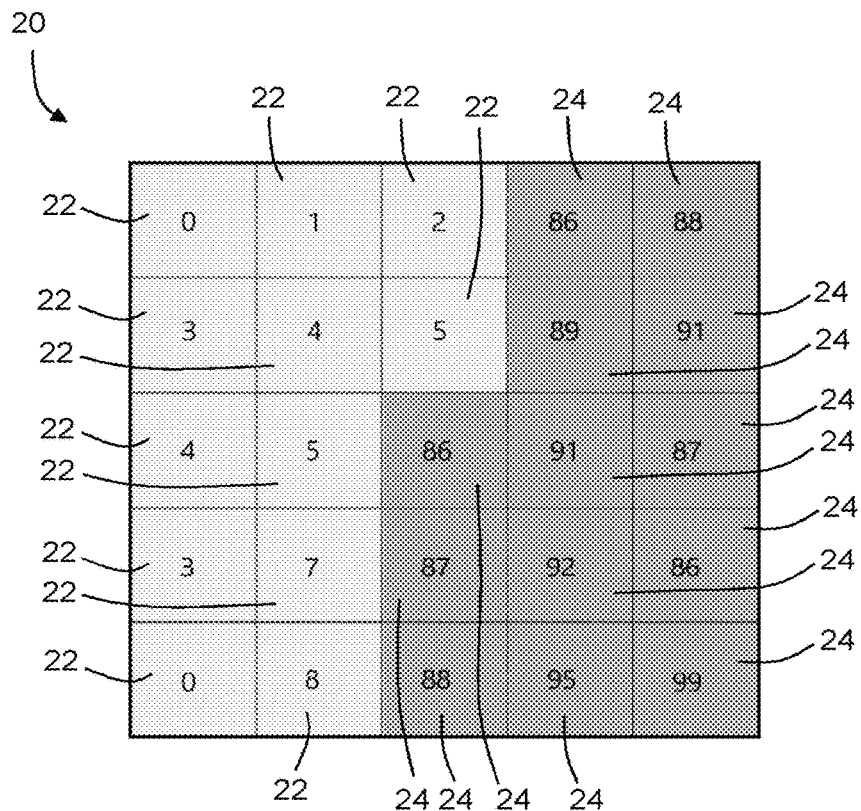
FIG. 2 illustrates an exemplary set of voxels with associated voxel values.

Consider again the region 20 of voxels that are illustrated in FIG. 2. As described above, if naïve thresholding is applied to the region 20 of voxels illustrated in FIG. 2, all of the voxels are set as non-visible. Applying morphological dilation would not make any difference to this case, since there is no visible section to dilate.

Figure 1:
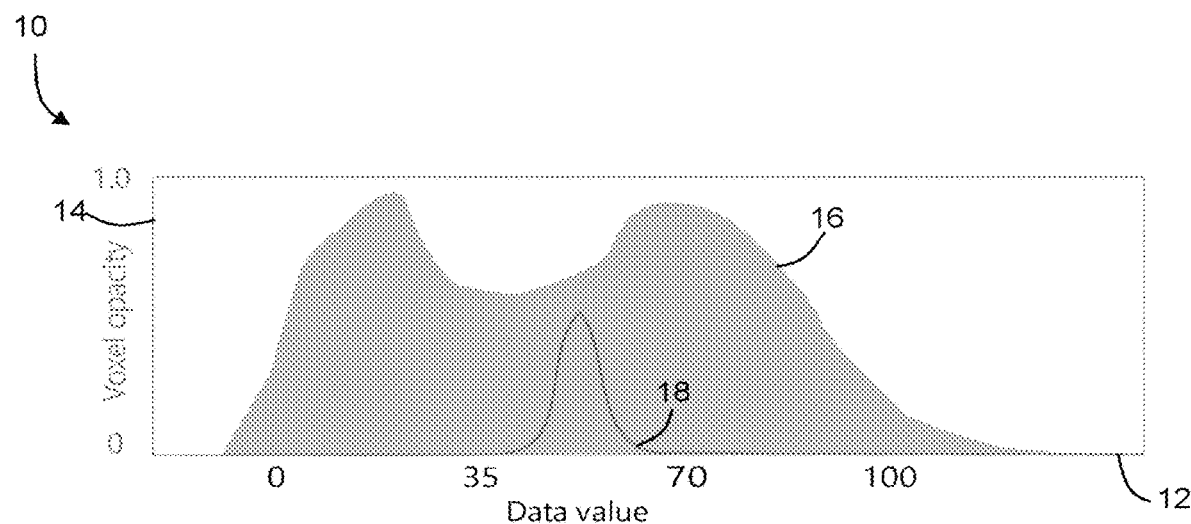
FIG. 1 illustrates an example of a transfer function.
Figure 6:
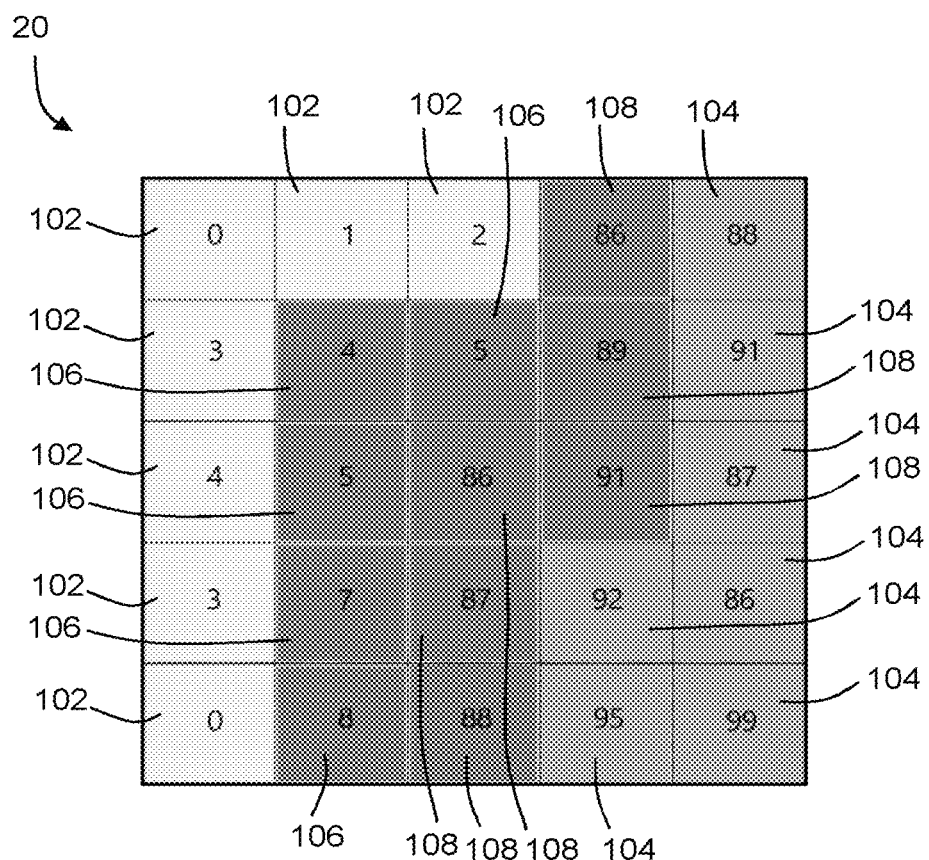
FIG. 6 illustrates the exemplary set of voxels of FIG. 2, classified using a method in accordance with an embodiment.

FIG. 6 illustrates what happens if the method of FIG. 4 is applied to region 20, using the transfer function of FIG. 1. The method of FIG. 4 takes into account the effect of interpolation. If a sample point is between a voxel having a high data value and a voxel having a low data value, the sample point may have a data value that is intermediate between the high data value and the low data value. In the case of region 20, a sample point having a position between the voxels 22 having low data values and the voxels 24 having high data values may have an intermediate data value, for example a data value between 35 and 70. This intermediate data value is a value that is visible according to the sample function.

In FIG. 6, a first set of voxels 102 comprises voxels that have low data values that are not visible according to the transfer function, and that also would not contribute to any interpolated data values that are visible according to the transfer function. Voxels 102 are designated as non-visible.

A second set of voxels 104 comprises voxels that have high data values that are not visible according to the transfer function, and that also would not contribute to any interpolated data values that are visible according to the transfer function. Voxels 104 are designated as non-visible.

A third set of voxels 106 comprises voxels that have low data values that are not visible according to the transfer function. However, the position of the third set of voxels 106 at the boundary is such that voxels 106 could contribute to interpolated data values that are visible according to the transfer function. Voxels 106 are therefore designated as visible.

A fourth set of voxels 108 comprises voxels that have high data values that are not visible according to the transfer function. However, the position of the fourth set of voxels 108 at the boundary is such that voxels 108 could contribute to interpolated data values that are visible according to the transfer function. Voxels 108 are therefore designated as visible.

In summary, interpolated samples in the neighborhood of voxels 106, 108 can map to parts of the transfer function that have non-zero opacity, and so voxels 106 and 108 are designated as visible. Voxels 106, 108 are designated as visible voxels in a data structure that is provided to the rendering circuitry 46. The boundary in region 20 may therefore be visible in the resulting rendering.

In the method of FIG. 4, the visibility table 80 contains values for summed visibility. A difference between summed visibility values for minimum and maximum data values in a region of interest is used to designate a voxel as visible or non-visible.

In other embodiments, the visibility table stores a summed opacity, and a difference between summed opacity values for minimum and maximum data values in a region of interest is used to designate a voxel as visible or non-visible.

Figures 7, 8:
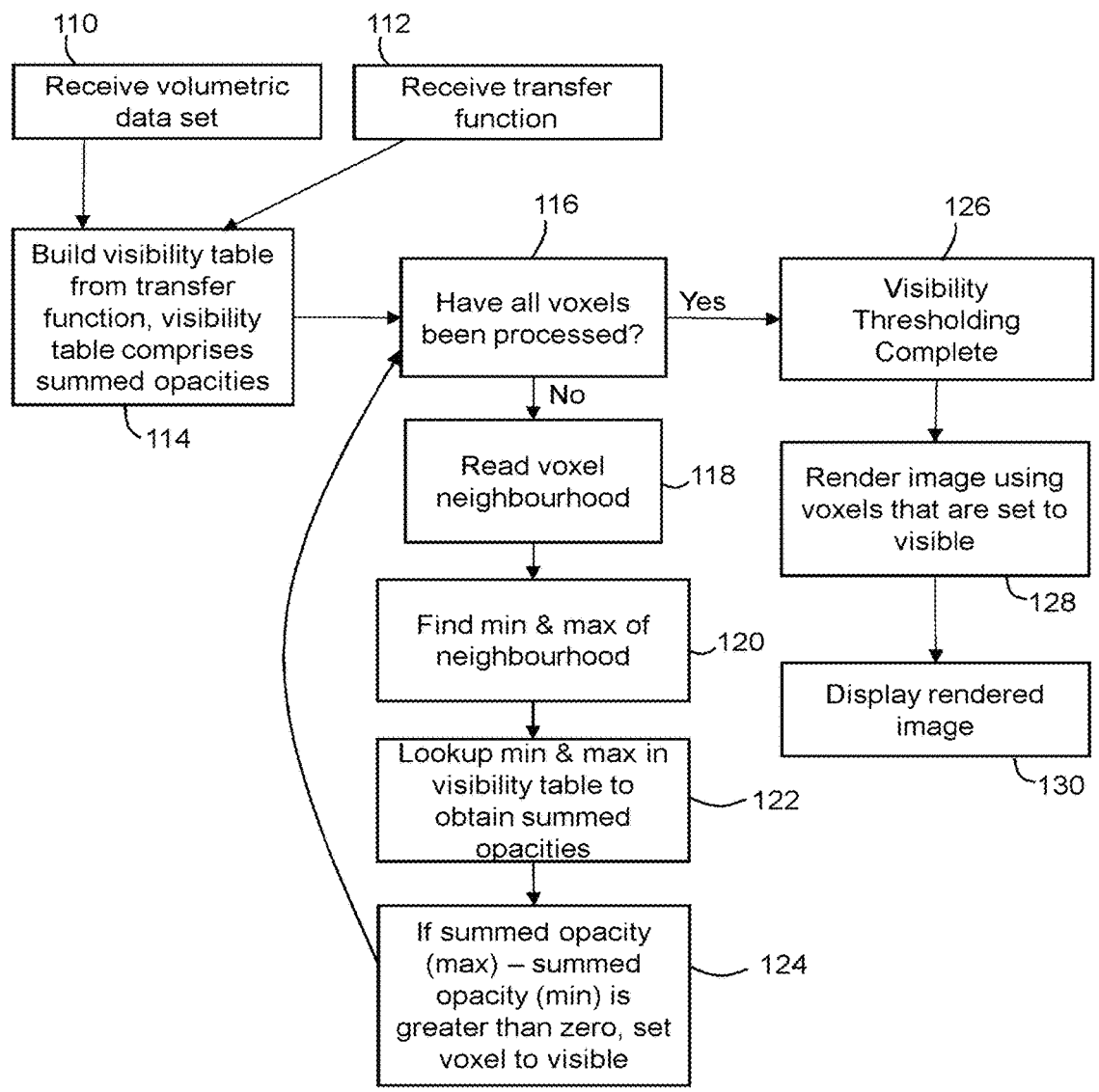
FIG. 7 is a flow chart illustrating in overview a method in accordance with an embodiment.
FIG. 8 is an example of a visibility table.

FIG. 7 is a flow chart illustrating in overview a method of an embodiment. At stage 110, the visibility circuitry 44 receives a volumetric image data set. At stage 112, the visibility circuitry 44 receives a transfer function. At stage 114, the visibility circuitry 44 builds a visibility table comprising summed opacities. An example 140 of a visibility table comprising summed opacities is shown in FIG. 8. The visibility table 140 is built using the same transfer function as was used to build visibility table 80 of FIG. 5.

The visibility circuitry 44 determines a range of data values that are present in the volumetric image data set. The visibility circuitry 44 determines maximum and minimum data values data min and data max for the volumetric image data set. A first row 142 of the visibility table 140 comprises data values from data min to data max. A second row 144 of the visibility table 140 comprises a respective opacity value for each of the data values from data min to data max. In this embodiment, the opacity values may be used as first index values.

A third row 146 of the visibility table 140 comprises a respective summed opacity value for each of the data values from data min to data max. The summed opacity value for a given data value is obtained by summing opacity for all data values from data min to the given data value.

Consider, for example, i=5 in the example of FIG. 8. The summed opacity is the sum of opacity values from i=data min=0 to i=5. The summed opacity is a sum of 0+0+0+0+0.25+0.4=0.65.

In this embodiment, the summed opacities may be used as second index values.

The visibility circuitry 44 stores the visibility table 140 in memory 48, or in any suitable location. In other embodiments, summed opacities may be stored in any suitable format.

At stage 116, the visibility circuitry 44 determines whether all voxels have been processed. At a first instance of stage 116, no voxels have yet been processed by the visibility thresholding process and the visibility circuitry 44 proceeds to stage 118.

At stage 118, the visibility circuitry 44 selects from the volumetric image data set one of the voxels that has not yet been processed by the visibility thresholding process. The visibility circuitry 44 sets a region of interests around the selected voxel. The visibility circuitry 44 reads the data values for the voxels in the region of interest.

At stage 120, the visibility circuitry 44 finds a maximum data value max s and a minimum data value min s of the data values for the voxels in the region of interest.

At stage 122, the visibility circuitry 44 looks up the minimum data value min s for the region of interest in the visibility table 140. The visibility circuitry 44 retrieves the value for summed opacity that is associated with the minimum data value min s in the visibility table 140.

The visibility circuitry 44 looks up the maximum data value max s for the region of interest in the visibility table 140. The visibility circuitry 44 retrieves the value for summed opacity that is associated with the maximum data value max s in the summed visibility table.

At stage 124, the visibility circuitry 44 obtains a difference between the summed opacity for the minimum data value and the summed opacity for the maximum data value. The difference between the summed opacities provides the sum of the opacities of all the data values in a range from min s to max s. If the difference in summed opacities is zero, this indicates that there are no data values having non-zero opacity in a range from min s to max s. Therefore, if the difference in summed opacities is zero, the visibility circuitry 44 designates the selected voxel as non-visible.

If the difference in summed opacities is greater than zero, this indicates that there is at least one data values having a non-zero opacity in the range from min s to max s. Therefore, if the difference in summed opacities is greater than zero, the visibility circuitry 44 designates the selected voxel as visible.

After stage 124, the method of FIG. 7 returns to stage 116. Stages 116 to 124 are repeated until each voxel in the volumetric image data set has been designated either as visible or as non-visible. Once all the voxels in the volumetric image data set have been processed, the method of FIG. 7 proceeds to stage 126.

At stage 126, visibility thresholding is complete. The result of the visibility thresholding algorithm is a data structure in which all of the voxels to be used for rendering are designated as visible. The visibility circuitry 44 passes the data structure to the rendering circuitry 46.

At stage 128, the rendering circuitry 46 renders an image from the volumetric image data set using the voxels that have been designated as visible in the data structure. Any suitable method of rendering may be used. For example, the rendering method may comprise ray casting, ray tracing or shear-warp.

The method of FIG. 7 uses summed opacities, whereas the method of FIG. 4 uses summed visibilities. However, both methods result in the same output. A data structure produced using the method of FIG. 7 includes the same visibility values as a data structure produced using the method of FIG. 4. In further embodiments, any suitable method may be used to determine visibility using the data values in the region of interest in combination with the transfer function, or information derived from the transfer function. The method may comprise using summed opacities and/or summed visibilities. Alternatively, the method may use individual opacity and/or visibility values for individual data values that are obtainable by interpolation within the region of interest. A choice of whether to use opacity values, visibility values, summed opacity values or summed visibility values may depend on particular circumstances, for example on an expected range of data values. In further embodiments, any suitable first index values and/or second index values may be used to determine visibility.

On some platforms, there may be a significant difference in performance between floating point arithmetic and integer arithmetic. Methods using summed visibility may use more integer arithmetic. Methods using summed opacity may use more floating point arithmetic. Therefore, in some circumstances, the use of summed visibility instead of summed opacity may result in better performance. In some cases, depending on a data range, it may be possible to use a 16 bit integer in the summed visibility case, rather than a 32 bit floating point number.

Information may be derived from the transfer function in any suitable way. For example, any suitable table, list or function may be used to map data values to visibility and/or opacity values.

In the embodiments of FIGS. 4 and 7, the visibility table may be considered to be a 1-dimensional table in which each individual data value is mapped to a corresponding index value (for example, visibility, summed visibility, opacity, or summed opacity).

In other embodiments, a 2-dimensional visibility table is used. In the 2-dimensional visibility table, each pair of data values is mapped to a corresponding index value.

One axis of 2-dimensional visibility table lists maximum data values. Another axis of the 2-dimensional visibility table lists minimum data values. The index value stored in the visibility table may be, for example, a difference in summed visibility values or a difference in summed opacity values. Using a 2-dimensional visibility table turns the visibility query into a single 2-dimensional lookup rather than two 1-dimensional lookups and a subtraction. Using a single 2-dimensional lookup may have performance benefits, for example when the tables are small. The use of a 2-dimensional table may be particularly suited to cases where the range of data values is low, for example 8 bit. In such cases, a 2-dimensional visibility table may be feasible from a memory and performance point of view.

In other embodiments, a data range may be very large. If the data range is very large, a visibility table may also be large. In some such embodiments, a sub-sampled table is used. The table does not store a respective index value for each possible data value. Instead, the table stores a respective index value for a subset of the data values. Storage requirements may be reduced by the use of sub-sampled tables.

In some embodiments, the sub-sampled table stores respective index values for half of the data values, for example for all even-numbered data values. When the visibility circuitry looks up an index value for the minimum data value in the region, it rounds down to the nearest stored data value if the requested data value is not available. When the visibility circuitry looks up an index value for the maximum data value in the region, it rounds up to the nearest stored data value if the requested data value is not available. A method using such rounding up of minimum data values and rounding up of maximum data values may still find all visible voxels. It may be the case that the finding of visible voxels is less precise when a sub-sampled visibility table is used than when a full visibility table is used.

The embodiments of FIG. 4 and FIG. 7 relate to linear interpolation. In linear interpolation, all possible interpolated values in a region of interest fall between a maximum data value and a minimum data value for the voxels in the region of interest. The same applies to some forms of cubic interpolation.

Different forms of cubic interpolation may have different constraints on the range of possible interpolated output values obtainable from the interpolation. B-spline cubic interpolation is bounded by the range of its inputs. Therefore, the methods of FIG. 4 and FIG. 7 may be directly applicable to cubic interpolation.

Other forms of cubic interpolation may have a different range of output values. Negative lobes on an interpolation curve may result in possible results of interpolation which can exceed the range of data values in the region of interest. Catmull-Rom interpolation has a slight sharpening effect which can result in the interpolation result going outside the range of the inputs.

Results of interpolation outside the original range of data values can be accounted for when designating voxels as visible or non-visible. In some embodiments, the visibility circuitry 44 determines a range of data values for voxels in the region of interest s. The visibility circuitry 44 then modifies the range of data values to obtain a range of possible outputs. For example, the visibility circuitry 44 may extend the range of data values such that it extends above the maximum data value max s for voxels in the region of interest, and/or extend the range of data values such that it extends below the minimum data value min s for voxels in the region of interest. The visibility circuitry 44 may then determine summed opacities and/or summed visibilities for the maximum and minimum values of the modified range, and designate the voxel as visible or non-visible based on the difference between the summed opacities and/or summed visibilities. Alternatively, the visibility circuitry 44 may determine opacity and/or visibility for each data value in the modified range, and designate the voxel as visible or non-visible based on the opacities and/or visibilities.

In the embodiments of FIG. 4 and FIG. 7, a rendering process is performed at stages 68 and 128 respectively. The rendering process comprises rendering an image using the voxels that have been designated as visible in the data structure. Voxels that have not been designated in rendering are not used in the rendering of the image.

In further embodiments, the visibility values stored in the data structure may be used to perform any suitable rendering process. The visibility values may be used as an input to any suitable form of image processing. The visibility values may be used as an input to a segmentation.

In further embodiments, the visibility values may be used to determine a position of an isosurface. The visibility values may be used to perform a measurement. For example, the visibility values may be used to determine a volume that is bounded by the isosurface. Methods described above may be used to accurately measure a volume enclosed by an isosurface. It may be desirable to accurately sample all voxels on the surface to determine the sub-voxel contribution of those voxels.

In some embodiments, a rendering process comprises rendering more than one object. Each object may be rendered using a respective transfer function. In some such embodiments, more than one visibility thresholding process is performed. A first visibility thresholding process is performed using a first transfer function to determine visibility of each voxel in a volumetric data set in a first object. A second visibility thresholding process is performed using a second, different transfer function to determine visibility of each voxel in the same volumetric data set in a second object. The transfer functions may differ such that some voxels that are visible with respect to the first object are not visible with respect to the second object, or vice versa. The visibility thresholding processes for the different objects may be performed simultaneously.

The visibility of multiple objects may be determined in a single pass by having multiple summed visibility tables. If a voxel is visible in multiple objects, the visibility circuitry 44 may label the voxel for special handling. Such labelling may be useful in a system in which a voxel can only have a single object and overlapping object support is needed.

In embodiments described above, a volumetric image data set is processed to determine a respective visibility for each voxel of the volumetric image data set. In other embodiments, a two-dimensional image data set may be processed using methods similar to those described above. In some embodiments, each pixel of a two-dimensional image data set has an associated data value. For each pixel, the visibility circuitry 44 determines a region of interest, which is a two-dimensional region comprising a plurality of pixels. The visibility circuitry 44 determines a maximum data value and a minimum data value for the region of interest, and designates the pixel as visible or non-visible using a method as described above, for example using a difference between summed opacities and/or summed visibilities for the pixel of interest.

In further embodiments, a method as described above may be applied to four-dimensional image data, for example a time series of volumes. In other embodiments, a method as described above may be applied to one-dimensional data.

In embodiments described above, the image data sets comprise medical image data, for example CT data. In other embodiments, the image data sets may comprise any suitable form or forms of medical image data, for example CT data, MR data, X-ray data, PET data, or SPECT data. The image data sets may be obtained by imaging any suitable anatomical region of any patient or other subject, using any suitable imaging modality or modalities. The patient or other subject may be human or animal.

In further embodiments, the image data sets may comprise any form of image data, which may not be medical. For example, the image data may comprise engineering visualization data, meteorological data, or seismic data.

In further embodiments, a method as described above may be used on any suitable data, which may not comprise image data.

Certain embodiments provide a system to determine the visibility of a set of voxels in a volumetric visualization system. The system analyses all voxels that contribute to a region to determine a range of possible interpolated values for that region. The interpolated range is tested against a visibility function to determine if the voxel is visible.

A summed visibility table may be used to accelerate the range visibility test. Linear interpolation may be used. Cubic interpolation may be used. The visibility of multiple objects may be determined in a single pass. The sum of the voxel opacities may be stored in the summed visibility table. The sum of the voxel visibilities may be stored in the summed visibility table.

Certain embodiments provide a medical processing apparatus comprising a processing circuitry configured to: receive image data set for rendering, specify a target pixel/voxel within the image dataset, set a region/volume of interest including the specified target pixel/voxel, decide a necessity of displaying the specified target pixel/voxel based on the maximum and minimum data values included in the set region/volume of interest, render the image data set based on the target pixel/voxel which is decided to display.

The medical processing apparatus may further comprise a memory which memory a first index value which indicates a necessity of displaying each data value.

The processing circuitry may be further configured to: decide to display the specified target pixel/voxel, further based on a second index which is a summed value of the first index.

The processing circuitry may be further configured to: decide to display the specified target pixel/voxel, further based on the second index values corresponding to the maximum and minimum data values.

The processing circuitry may be further configured to: decide to display the specified target pixel/voxel, when the difference value of second index values corresponding to the maximum and minimum data values are positive.

Certain embodiments provide a method for determining a respective visibility for each of a set of voxels in a volumetric visualization system, the method comprising: for each voxel in the set of voxels, obtaining data values for a set of sample points in a neighborhood of the voxel; determining a range of possible interpolated data values between the data values for the set of sample points; applying a visibility function to the range of possible interpolated data values to determine whether any of the possible interpolated data values is visible; and if any of the possible interpolated data values is determined to be visible, setting the voxel to be visible.

The method may further comprise rendering only voxels of the set of voxels that are set to be visible. The visibility function may comprise a transfer function mapping opacity to data value. The visibility function may further comprise an opacity threshold to determine which values of opacity are visible.

The method may further comprise using the visibility function to generate a summed visibility table. The summed visibility table may comprise a respective summed visibility for each data value.

Applying the visibility function to the range of possible interpolated data values may comprise: determining a minimum data value and a maximum data value for the range of possible interpolated data values; looking up the minimum data value in the summed visibility table to obtain a summed visibility value for the minimum data value; looking up the maximum data value in the summed visibility table to obtain a summed visibility value for the maximum data value; and, if a difference between the summed visibility value for the minimum data value and a summed visibility value for the maximum data value is non-zero, determining that at least one of the possible interpolated data values is visible. The summed visibility table may comprise a respective summed opacity for each data value.

Applying the visibility function to the range of possible interpolated data values may comprise: determining a minimum data value and a maximum data value for the range of possible interpolated data values; looking up the minimum data value in the summed visibility table to obtain a summed opacity value for the minimum data value; looking up the maximum data value in the summed visibility table to obtain a summed opacity value for the maximum data value; and if a difference between the summed opacity value for the minimum data value and a summed opacity value for the maximum data value is non-zero, determining that at least one of the possible interpolated data values is visible.

The possible interpolation values may comprise values obtainable by linear interpolation of the data values for the set of sample points. The possible interpolation values may comprise values obtainable by cubic interpolation of the data values for the set of sample points.

The method may further comprise applying at least one further visibility function to the range of possible interpolated data value, thereby determining visibility of a plurality of objects. The method may further comprise labelling any voxel of the set of voxels that is found to be visible by more than one visibility function. The method may further comprise applying an overlapping object to any labelled voxel.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical processing apparatus comprising processing circuitry configured to:
   receive an image data set for rendering;
   for each of a plurality of a pixels or voxels in the image data set:
      set a region of interest around the pixel or voxel, the region of interest comprising pixels or voxels that could be combined with the pixel or voxel during interpolation;
      determine a maximum data value and a minimum data value for pixels or voxels in the region of interest, thereby determining a range of possible interpolated data values; and
      designate the pixel or voxel as visible or as non-visible based on whether any of the possible interpolated values is visible; and
   perform a rendering process using the pixels or voxels of the image data set that are designated as visible.

2. The apparatus according to claim 1, further comprising a memory configured to store a plurality of data values, and to store a respective first index value for each of the plurality of data values, wherein the first index value is representative of opacity or visibility.

3. The apparatus according to claim 2, wherein the designating of the pixel or voxel as visible or as non-visible comprises:
   determining a range of data values based on the minimum data value and the maximum data value; and
   determining a respective first index value for each of the range of data values using the stored first index values;
   designating the pixel or voxel as visible or as non-visible based on the first index values for the range of data values.

4. The apparatus according to claim 3, wherein the range of data values comprises a range of data values obtainable by interpolation between the maximum data value and the minimum data value.

5. The apparatus according to claim 4, wherein the interpolation comprises at least one of linear interpolation, cubic interpolation, B-spline interpolation, Catmull-Rom interpolation.

6. The apparatus according to claim 1, further comprising a memory configured to store a plurality of data values, and to store a respective second index value for each of the plurality data values, wherein the second index value is representative of summed opacity or summed visibility.

7. The apparatus according to claim 6, wherein the designating of the pixel or voxel as visible or as non-visible comprises:
   determining a second index value for the minimum data value;
   determining a second index value for the maximum data value; and
   designating the pixel or voxel as visible or as non-visible based on the second index value for the minimum data value and the second index value for the maximum data value.

8. The apparatus according to claim 7, wherein the designating of the pixel or voxel as visible or as non-visible is based on a difference between the second index value for the minimum data value and the second index value for the maximum data value.

9. The apparatus according to claim 7, wherein the designating of the pixel or voxel as visible or as non-visible comprises:
   designating the pixel or voxel as visible if a difference between the second index value for the minimum data value and the second index value for the maximum data value exceeds a threshold value; and
   designating the pixel or voxel as non-visible if a difference between the second index value for the minimum data value and the second index value for the maximum data value is at or below the threshold value.

10. The apparatus according to claim 9, wherein the threshold value is zero.

11. The apparatus according to claim 6, wherein the memory is configured to store the data values and second index values as at least one of: a table, a look-up table, a list, a function.

12. The apparatus according to claim 6, wherein the summed opacity for a given data value comprises a sum of opacities corresponding to a range of data values from a global minimum to the given data value and/or wherein the summed visibility for a given data value comprises a sum of visibilities corresponding to a range of data values from a global minimum to the given data value.

13. The apparatus according to claim 12, wherein the global minimum is a minimum data value for the entire image data set.

14. The apparatus according to claim 1, wherein the rendering process comprises rendering an image using the pixels or voxels of the image data set that are designated as visible.

15. The apparatus according to claim 1, wherein the rendering process comprises using the designation of voxels as visible or non-visible as an input to at least one of an image processing algorithm, a segmentation algorithm.

16. The apparatus according to claim 1, wherein the rendering process comprises at least one of determining a position of an isosurface, determining a volume bounded by an isosurface.

17. The apparatus according to claim 1, wherein the processing circuitry is configured to designate a pixel or voxel as visible or as non-visible in a first object based on the maximum data value and the minimum data value for the region of interest, and further configured to determine designate the pixel or voxel as visible or as non-visible in a second, different object based on the maximum data value and the minimum data value for the region of interest.

18. The apparatus according to claim 17, wherein designating of the pixel or voxel as visible or as non-visible in the first object is based on a first stored set of first index values and/or second index values for a plurality of data values, and wherein the designating of the pixel or voxel as visible or as non-visible in the second object is based on a second, different stored set of first index value and/or second index values for the plurality of data values.

19. The apparatus according to claim 17, wherein the processing circuitry is further configured to identify for further processing any pixel or voxel that is designated as visible in both the first object and the second object.

20. A medical processing method comprising:
receiving an image data set for rendering;
for each of a plurality of a pixels or voxels in the image data set:
setting a region of interest around the pixel or voxel, the region of interest comprising pixels or voxels that could be combined with the pixel or voxel during interpolation;
determining a maximum data value and a minimum data value for pixels or voxels in the region of interest, thereby determining a range of possible interpolated data values; and
designating the pixel or voxel as visible or as non-visible based on whether any of the possible interpolated values is visible; and
performing a rendering process using the pixels or voxels of the image data set that are designated as visible.

* * * * *